United States Patent Office 3,809,537
Patented May 7, 1974

3,809,537
TEST FOR LEAD
Angela A. Horine, 1675 Clay Drive,
Los Altos, Calif. 94022
No Drawing. Filed May 2, 1972, Ser. No. 249,638
Int. Cl. G01n 21/04
U.S. Cl. 23—230 R                     6 Claims

ABSTRACT OF THE DISCLOSURE

Lead in concentrations in the range 4–40 p.p.m. in aqueous solution of pH 1–5 is visually detected by adding a solution of a soluble sulfide.

---

This invention relates to an improved method of testing for lead. More particularly, it relates to a qualitative test for lead in the concentration range four to forty parts per million. Still more particularly, it relates to such a test wherein the lead is perceived visually by the formation of lead sulfide.

It is known that amounts of lead on the order of 4–7 p.p.m. can be determined by using dithizone or various instrumental methods. However such tests require special equipment and chemicals and often involve complicated experimental procedures. A simple qualitative test is needed which can be conducted by the average layman in his own home.

One reason such a simple test is needed is that people have been poisoned by consuming acid foods stored in pottery containers the glaze of which contains lead leachable by food acids. Many people would like a simple test capable of reassuring them that their pottery is safe to eat from. When lead is leached from pottery using 4% acetic acid solution, the limit concentration presently considered unsafe by the United States Food and Drug Administration is 7 p.p.m. Legislation specifying 4 p.p.m. as the tolerable limit is being considered by the State of California. No simple, inexpensive test for detecting lead in the range 4–7 p.p.m. appears to be commercially available to the public.

One well-known qualitative test for lead together with certain other metals such as copper, bismuth, and antimony consists of adjusting the pH in the region of about 0 to 2 and bubbling in hydrogen sulfide gas. If lead is present in sufficient quantity, a black precipitate is formed. In order to use this test for testing pottery, the test should give an unmistakably positive result for lead in the concentration 7 p.p.m., and preferably 4 p.p.m. Moreover, for the convenience of the public this test should work when the leaching agent is common household vinegar.

We found that although such a test was relatively unambiguous at the 4 p.p.m. level to an experienced person in a well lighted laboratory with a control, it might be confusing, ambiguous, and complicated for ordinary people in their homes. The dosage of hydrogen sulfide gas is hard to control and large excesses must be avoided because hydrogen sulfide is poisonous and inadequate ventilation must be assumed. Even when the solution is well saturated with hydrogen sulfide, the degree of darkening may be ambiguous to someone inexperienced without a control, particularly when vinegar, which tends to decrease the intensity of the darkening, is used. The problem is aggravated by poor lighting and colored backgrounds and solutions.

One object of the present invention is to provide a simple test whereby untrained members of the public in their own homes can separate their articles of pottery into one group which meets governmental regulations concerning lead release and another group which remains suspect.

Another object is to provide a test or pottery which, if negative, will assure the tester that his pottery may be used in contact with food without danger of lead poisoning.

Another object is to provide a simple test which can be used without a control to give an unambiguous positive result by visual inspection when lead is present in an aqueous solution of pH in the range 1–5 in a concentration in the range 4–7 p.p.m., even if the background or the solution before testing may be colored.

It has now been found that in distinguishing lead as lead sulfide by visual inspection in acid solution at concentrations of roughly 7 p.p.m. a solution of a soluble sulfide is superior to gaseous hydrogen sulfide as the source of sulfide. One might have expected that a soluble sulfide added to an acid solution would give substantially the same result as hydrogen sulfide. Surprisingly, tests with soluble sulfide and vinegar are not only more easily performed but more unambiguous under conditions of poor lighting, non-white background, or colored vinegar solution.

The active principal in the test reagent is sulfide ion, and any colorless soluble sulfide solution is usable including those in which the sulfide is bound or contained in a chemical complex or compound from which it is readily liberated upon contact with the lead-containing acid solution. Preferred soluble sulfides include the sulfides and hydrosulfides of the alkali metals, alkaline earth metals, and ammonia. Sodium sulfide is particularly preferred because of its ready availability and low cost.

The lead-containing solution to which the sulfide is added should in general have a pH in the range 1–5, preferably 2–4. Preferred are those solutions of organic acids known for leaching pottery, paint flakes, and other objects or substances to determine lead release. An example of aqueous acetic acid solution for such a use is ASTM–C555–71. Examples of other suitable organic acids include citric, tartaric, maleic, adipic, succinic, propionic, and lactic. Vinegar is a particularly preferred acid solution because it is readily available to the public at low cost.

The test consists simply of adding a small amount of the soluble sulfide solution to the acid solution to be tested. If lead is present in concentrations greater than 4 p.p.m., a pale brown, grey, or black color will be produced depending on the amount of lead present. If no darkening is perceptible within 5 minutes, the concentration of lead is less than 4 p.p.m.

If darkening does occur either lead or one of several other elements may be present. When this test is applied to pottery, a positive test is generally caused by lead rather than the other possible elements.

The amount of sulfide solution added is of little concern as demonstrated in the examples below. Preferred concentrations of the sulfide solution are 1% to 50% by weight, even more preferably about 5% by weight. Preferred amounts of sulfide solution added are 1 drop to 1 ml., and preferred amounts of the acid solution to which sulfide is added are 5 ml. to 200 ml. Other amounts may be used without departing from the sense of the invention.

The following examples further illustrate the invention. Example 1 shows one preferred embodiment of the invention. Examples 2 and 3 show the superiority of soluble sulfide over hydrogen sulfide. Examples 5, 15, and 16 show that the sulfide moiety is the essential reagent while the cation associated with sulfide is not important. Example 14 is an example of a soluble sulfide wherein the sulfide moiety is contained in a chemical compound from which it is readily liberated upon contact with acid. Examples 4, 5, 12, and 13 show that the concentration of the sulfide and the relative volume added to the acid solution are of little consequence. Examples 5, 7, 8, 9, 10, and 11 show that the acid component of the solution is not critical and the pH may be in the range 1–5. Examples 17 and 18 demonstrate the utility of this invention.

EXAMPLE 1

To 50 ml. of Heinz white distilled vinegar containing 7 p.p.m. of elemental lead in a size 09 porcelain crucible was added 0.5 ml. of 5% by weight sodium sulfide nonahydrate in water. A brown color was immediately produced. When this test was repeated with vinegar in which lead was absent, nor color or darkening could be discerned.

EXAMPLE 2

A solution of 50 ml. of 5% by weight acetic acid in water containing 200 mg. of Instant Folger's Coffee Crystals and 7 p.p.m. lead was placed in a 150 ml. beaker mounted 5 inches above a white background in a well-lighted room. Hydrogen sulfide gas was bubbled in at a rate of 100 ml./min. While the solution darkened slightly, it was essentially impossible to identify lead visually with confidence at the 7 p.p.m. level without a control. Even with a control, the difference was subtle.

EXAMPLE 3

A solution of 50 ml. of 5% by weight acetic acid in water containing 200 mg. of Instant Folger's Coffee Crystals and 7 p.p.m. lead was placed in a 150 ml. beaker mounted 5 inches above a white background in a well-lighted room. Three drops (0.15 ml.) of a 5% by weight aqueous solution of sodium sulfide nonahydrate was added and the solution was viewed from the top. Within about 15 sec., the lead could be identified visually without a control.

EXAMPLES 4 THROUGH 16

In every example in the table below, the presence of lead was determined visually by variants of the present invention. To the specified aqueous acid solution contained in a beaker of capacity two to four times the specified acid volume and containing the specified concentration of lead was added the specified amount of the specified sulfide solution. The resulting color is noted under results.

EXAMPLE 17

A small Mexican ceramic pot was filled with Heinz white distilled vinegar and allowed to stand uncovered at room temperature for 24 hrs. The solution was poured into a white paper cup and 5 drops (0.25 ml.) of 5% aqueous sodium sulfide nonahydrate solution was added. A dense black precipitate was observed. Confirmatory tests established that the pot did indeed contain dangerous amounts of acid-soluble lead.

EXAMPLE 18

Paint flakes from an old house were crushed and one tablespoonful was placed in a coffee cup. The cup was half filled with Heinz white distilled vinegar and allowed to stand overnight. The solution was decanted into another cup and 5 drops (0.25 ml.) of 5% aqueous sodium sulfide nonahydrate solution was added. A faint greyish-brown cloudiness was observed, indicating that large amounts of acid-soluble lead were absent, but small amounts of lead might be present.

The preceding examples have been set forth to illustrate modes of practice of the invention and to demonstrate the results thereby obtainable. It is not intended that these examples be unduly limiting of the invention which, rather, is intended to be defined by the method steps, reactants, solvents, and reaction conditions and all apparent equivalents of the aforementioned set forth in the following claims:

I claim:

1. A method of testing for lead in the concentration range four to forty parts per million dissolved in an aqueous solution with a pH in the range 1–5 which method comprises adding a solution of a soluble sulfide and inspecting the resulting solution visually.

2. The method of claim 1 in which the soluble sulfide is selected from the group consisting of sulfides and hydrosulfides of lithium, sodium, potassium, ammonium, calcium, strontium and barium.

3. The method of claim 1 in which the acid solution is substantially acetic acid in water at a concentration from about 1% to about 10% by weight.

4. The method of claim 2 in which the acid solution comprises an organic acid in water at a concentration from about 1% to about 10% by weight.

5. The method of claim 4 in which the organic acid is selected from the group consisting of acetic acid and citric acid.

6. The method of claim 2 in which the aqueous solution is ordinary household vinegar.

| Example number | Soluble sulfide | Conc. of aqueous sulfide solution, percent by wt. | Amount of sulfide soln., ml. | Aqueous acid solution | Amount of acid soln., ml. | Conc. of lead, p.p.m. | Result |
|---|---|---|---|---|---|---|---|
| 4 | $Na_2S \cdot 9H_2O$ | 0.1 | *0.05 | 5% by wt. acetic acid | 500 | 7 | Greyish-brown (disappears on stirring) |
| 5 | $Na_2S \cdot 9H_2O$ | 5 | 0.5 | do | 50 | 4 | Greyish-brown. |
| 6 | $Na_2S \cdot 9H_2O$ | 5 | 0.5 | do | 50 | 4,000 | Dense brownish-black. |
| 7 | $Na_2S \cdot 9H_2O$ | 5 | 0.05 | 0.1% acetic acid | 50 | 7 | Greyish-brown. |
| 8 | $Na_2S \cdot 9H_2O$ | 5 | 0.05 | Heinz white distilled vinegar | 50 | 7 | Do. |
| 9 | $Na_2S \cdot 9H_2O$ | 5 | 0.05 | 5% citric acid | 50 | 7 | Dark brown. |
| 10 | $Na_2S \cdot 9H_2O$ | 5 | 0.05 | 0.1 N HCl (pH 1) | 50 | 7 | Greyish-brown (disappears on stirring). |
| 11 | $Na_2S \cdot 9H_2O$ | 5 | 0.05 | Sodium acetate-acetic acid buffer (pH 5). | 50 | 7 | Greyish-brown. |
| 12 | $Na_2S \cdot 9H_2O$ | 5 | 5.0 | 5% acetic acid | 5 | 7 | Yellowish-grey. |
| 13 | $Na_2S \cdot 9H_2O$ | 50 | 0.05 | do | 50 | 7 | Greyish-brown. |
| 14 | Na polysulfide | 5 | 0.5 | do | 50 | 7 | Pale milky grey. |
| 15 | $NH_4HS$ | 5 | 0.5 | do | 50 | 7 | Greyish-brown. |
| 16 | BaS | 5 | 0.5 | do | 50 | 7 | Do. |

*1 drop.

References Cited

Indust. and Eng. Chem. (Anal. Ed.), vol. 10, No. 10, Oct. 15, 1938, pp. 599–600.

Jacobs, "Analytical Chem. of Industrial Poisons, Hazard and Solvents," Interscience Publishers Inc., New York, N.Y., 1949, p. 199.

MORRIS O. WOLK, Primary Examiner

R. E. SERWIN, Assistant Examiner